US012205125B2

(12) United States Patent
Cadieux et al.

(10) Patent No.: US 12,205,125 B2
(45) Date of Patent: *Jan. 21, 2025

(54) METHODS AND PRODUCTS FOR PRODUCT TRACING AND AUTHENTICATION USING CONDUCTIVE INKS

(71) Applicant: Altria Client Services LLC, Richmond, VA (US)

(72) Inventors: Edmond J. Cadieux, Mechanicsville, VA (US); Kevin Harrup, Hopewell, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/700,869

(22) Filed: Mar. 22, 2022

(65) Prior Publication Data
US 2022/0215403 A1    Jul. 7, 2022

Related U.S. Application Data

(62) Division of application No. 14/933,674, filed on Nov. 5, 2015, now Pat. No. 11,288,683.
(Continued)

(51) Int. Cl.
*G06Q 10/10* (2023.01)
*G06K 19/067* (2006.01)
(Continued)

(52) U.S. Cl.
CPC ....... *G06Q 30/0185* (2013.01); *G06K 19/067* (2013.01); *G06Q 30/018* (2013.01); *G06Q 50/18* (2013.01)

(58) Field of Classification Search
CPC .. G06Q 30/0185; G06Q 30/018; G06Q 50/18; G06K 19/067; G06K 19/10; G06F 21/44
(Continued)

(56) References Cited

U.S. PATENT DOCUMENTS 6,069,955 A    5/2000  Coppersmith et al.
6,142,533 A    11/2000 Borowski, Jr.
(Continued)

FOREIGN PATENT DOCUMENTS

AU    2014233547 A1    10/2014
CN       2630949 Y      8/2004
(Continued)

OTHER PUBLICATIONS

Mar. 2, 2016 International Search Report and the Written Opinion of the International Searching Authority, or the Declaration issued in corresponding International Application No. PCT/US/2015/059235.
(Continued)

*Primary Examiner* — Jonathan P Ouellette

(74) *Attorney, Agent, or Firm* — Harness, Dickey & Pierce, P.L.C.

(57) ABSTRACT

Example embodiments of a product authentication method may include triggering a first authentication process in response to sensing a conductive ink in proximity to a computing device having a set of sensors and performing a second authentication process. The first authentication process may include initiating an application on the computing device when the set of sensors senses the conductive ink. And the second authentication process may be performed by the application on the computing device and may include sending a code to a remote server and receiving a validity determination from the remote server.

14 Claims, 9 Drawing Sheets

Related U.S. Application Data

(60) Provisional application No. 62/076,118, filed on Nov. 6, 2014.

(51) Int. Cl.
*G06Q 30/018* (2023.01)
*G06Q 50/18* (2012.01)

(58) Field of Classification Search
USPC .................................. 705/1.1, 311, 317, 318
See application file for complete search history.

(56) References Cited

U.S. PATENT DOCUMENTS

| | | |
|---|---|---|
| 6,442,276 B1 | 8/2002 | Doljack |
| 6,766,947 B2 | 7/2004 | Wan et al. |
| 7,686,231 B2 | 3/2010 | Hamilton |
| 8,171,567 B1 | 5/2012 | Fraser et al. |
| 8,348,146 B1 | 1/2013 | Aurich |
| 8,671,062 B2 | 3/2014 | Sager et al. |
| 8,771,558 B2 | 7/2014 | Huang et al. |
| 9,378,451 B2 | 6/2016 | Forster |
| 10,068,237 B2 | 9/2018 | Simske et al. |
| 2002/0167500 A1 | 11/2002 | Gelbman |
| 2005/0006472 A1 | 1/2005 | Verschuur et al. |
| 2005/0156318 A1 | 7/2005 | Douglas |
| 2006/0169787 A1 | 8/2006 | Gelbman |
| 2006/0230276 A1 | 10/2006 | Nochta |
| 2007/0156281 A1 | 7/2007 | Leung et al. |
| 2008/0002882 A1 | 1/2008 | Voloshynovskyy et al. |
| 2008/0022098 A1 | 1/2008 | Muscat et al. |
| 2008/0046263 A1 | 2/2008 | Sager et al. |
| 2008/0067475 A1 | 3/2008 | McCulloch et al. |
| 2008/0122881 A1 | 5/2008 | Iftime et al. |
| 2008/0135629 A1 | 6/2008 | Douglas |
| 2008/0272882 A1 | 11/2008 | Numao et al. |
| 2009/0072946 A1 | 3/2009 | von Reischach et al. |
| 2009/0219132 A1 | 9/2009 | Maytal et al. |
| 2010/0289627 A1 | 11/2010 | McAllister et al. |
| 2011/0251969 A1 | 10/2011 | Gogo et al. |
| 2011/0276412 A1 | 11/2011 | Mgrdechian et al. |
| 2011/0276502 A1 | 11/2011 | Dameri |
| 2012/0179517 A1 | 7/2012 | Tang et al. |
| 2012/0212241 A1 | 8/2012 | Wallace et al. |
| 2012/0234908 A1 | 9/2012 | Wang et al. |
| 2013/0008962 A1 | 1/2013 | Anand |
| 2013/0067586 A1 | 3/2013 | Pagan |
| 2013/0173383 A1 | 7/2013 | Sharma et al. |
| 2014/0014714 A1 | 1/2014 | Tang |
| 2014/0055243 A1 | 2/2014 | Kerai |
| 2014/0105449 A1 | 4/2014 | Caton et al. |
| 2014/0197052 A1 | 7/2014 | Block et al. |
| 2015/0227947 A1 | 8/2015 | Ching |
| 2016/0027021 A1 | 1/2016 | Kerdemelidis |

FOREIGN PATENT DOCUMENTS

| | | |
|---|---|---|
| CN | 201023810 Y | 2/2008 |
| WO | WO-2014045236 A2 | 3/2014 |
| WO | WO-2014045236 A3 | 5/2014 |

OTHER PUBLICATIONS

International Preliminary Report on Patentability dated May 18, 2017 for PCT/US2015/059235.
Office Action for corresponding European Application No. 15856603.4 dated Jun. 6, 2018.
Manos M. Tentzeris et al., "Inkjet-Printed Paper/Polymer-Based RFID and Wireless Sensor Nodes: The Final Step to Bridge Cognitive Intelligence, Nanotechnology and RF?", "School of ECE, Georgia Tech", 2011, pp. 1-4.
Eurasian Office Action issued Oct. 8, 2018 in corresponding Application PCT/US2015/059235.
Eurasian Office Action dated Feb. 14, 2019 issued in corresponding Eurasian Application No. 201790996.
Office Action for corresponding Israeli Application No. 252139 dated Mar. 24, 2019.
Office Action dated Aug. 20, 2019, issued in corresponding Chinese Patent Application No. 201580072677.9.
Office Action for corresponding Israeli Application No. 252139 dated May 24, 2020, with English translation.
Office Action for corresponding Ukranian Application No. a201705539 dated Jun. 18, 2020, with English translation.
Office Action dated Aug. 13, 2020, issued in corresponding Chinese Patent Application No. 201580072677.9, with English translation.
Examination Report dated Oct. 12, 2020, issued in corresponding European Application No. 15856603.4.
Examination Report for Malaysian Application No. PI 2017000665 dated Feb. 21, 2021.
Office action for corresponding Israeli Application No. 252139, dated Feb. 18, 2021.
Rejection Decision for corresponding Chinese Application No. 201580072677.9, dated Mar. 30, 2021.
Chinese Third Office Action for corresponding Application No. 201580072677.9, dated Sep. 16, 2021, English translation included herewith.
Israeli Office Action for corresponding Application No. 252139, dated Nov. 30, 2021, with English Translation.
Chinese Fourth Office Action for corresponding Application No. 201580072677.9, dated Jan. 20, 2022, English translation included herewith.
Ukraine Office Action for corresponding Application No. a202000267, dated Apr. 21, 2023.
Israeli Office action for corresponding Application No. 290691, dated Jun. 14, 2022.
European Search Report for corresponding Application No. 22201579.4, dated Jan. 5, 2023.
Malaysian Office Action for Application No. PI2021002390, dated Aug. 11, 2023, English translation attached.
Israeli Office action for corresponding Application No. 290691, dated Jun. 29, 2023.
Substantive Examination Adverse Report issued Oct. 31, 2023 in Malaysian Application No. PI2021002390.

METHODS AND PRODUCTS FOR PRODUCT TRACING AND AUTHENTICATION USING CONDUCTIVE INKS

CROSS-REFERENCE TO RELATED APPLICATIONS

This application is a divisional of U.S. application Ser. No. 14/933,674, filed on Nov. 5, 2015, which claims the benefit of U.S. Provisional Application No. 62/076,118, filed on Nov. 6, 2014, which is incorporated herein by reference.

FIELD

The present disclosure relates to methods and products for product tracing and authentication using conductive inks.

BACKGROUND

This section provides background information related to the present disclosure which is not necessarily prior art.

The development of a commercial economy brings a generation of tremendous counterfeit and imitation of products of well-known brands in various fields, which causes severe economic losses and social problems and brings anti-counterfeit technology into wide demand.

In some cases, a company makes products that are sold individually as well as a part of a package of products. In such cases, the products are sometimes diverted from legitimate customers, through the "open market", to illicit counterfeiting operations that counterfeit proprietary and trademark branded products of that company.

SUMMARY

This section provides a general summary of the disclosure, and is not a comprehensive disclosure of its full scope or all of its features.

A need has arisen to separate and distinguish products sold and/or shipped to legitimate distributors from counterfeit products.

Example embodiments of a product authentication method may include triggering a first authentication process in response to sensing a conductive ink in proximity to a computing device having a set of sensors and performing a second authentication process. The first authentication process may include initiating an application on the computing device when the set of sensors senses the conductive ink. And the second authentication process may be performed by the application on the computing device and may include sending a code to a remote server and receiving a validity determination from the remote server.

The first authentication process may include determining that the electrically conductive ink corresponds to an orientation of the set of sensors and initializing an internet browsing application when the electrically conductive ink corresponds to the orientation of the set of sensors.

The second authentication process may be performed after determining that the electrically conductive ink corresponds to an orientation of the set of sensors and include sending a package code to a remote server. As a further part of the second authentication process, the computing device may be configured to receive a determination of whether the package code is valid and end the internet browsing application when the package code is not valid. As a yet further part of the second authentication process, the computing device may be configured to receive a determination of whether the package code is unused and end the internet browsing application when the package code is not unused.

When both authentication processes are completed successfully, the computing device may be configured to receive product package history information from the remote server and receive access to product package vendor information.

A further example embodiment may include computing device having a non-transitory computer readable medium storing instructions that, when executed by a processor, cause the processor to trigger the first authentication process in response to sensing the conductive ink in proximity to the computing device having a set of sensors, initiate an application on the computing device when the set of sensors senses the conductive ink, perform a second authentication process, the second authentication process being performed by the application on the computing device and comprising, send a code to a remote server, and receive a validity determination from the remote server.

Additionally, in this further example embodiment, the processor may be caused to determine that the electrically conductive ink corresponds to an orientation of the set of sensors, initialize an internet browsing application when the electrically conductive ink corresponds to the orientation of the set of sensors, perform the second authentication after determining that the electrically conductive ink corresponds to an orientation of the set of sensors, send a package code to a remote server, receive a determination of whether the package code is valid, end the internet browsing application when the package code is not valid, receive a determination of whether the package code is unused, end the internet browsing application when the package code is not unused, receive a product package history information from the remote server, and receive access to product package vendor information.

An example authentication process may include receiving confirmation from a computing device that a first code has triggered activation of an application running on the computing device, receiving a second code from the computing device, referring to a non-transitory computer readable medium to determine whether the second code is present in the non-transitory computer readable medium, and providing the computing device with access to software stored on the non-transitory computer readable medium when the second code is present in the non-transitory computer readable medium.

The example product authentication process may also include determining whether the second code is valid, sending an error message to the computing device when the second code is invalid, receiving a location of the computing device when the second code is not valid, and storing the location in the non-transitory computer readable medium. Similarly, the example authentication process may further include determining whether the second code is unused, sending an error message to the computing device when the second code is unused, receiving a location of the computing device when the second code is not unused, and storing the location in the non-transitory computer readable medium.

The example product authentication process may also include, when both authentication processes are completed successfully, sending product package history information to the computing device when the second code is not unused, and providing the computing device with access to product package vendor information.

A further example embodiment is an authentication server having a non-transitory computer readable medium storing instructions that, when executed by a processor, cause the processor to receive confirmation from a computing device that a first code has triggered activation of an application running on the computing device, receive a second code from the computing device, refer to a non-transitory computer readable medium to determine whether the second code is present in the non-transitory computer readable medium, and provide the computing device with access to software stored on the non-transitory computer readable medium when the second code is present in the non-transitory computer readable medium.

The authentication server processor may also determine whether the second code is valid and send an error message to the computing device when the second code is invalid, receive a location of the computing device when the second code is not valid, and store the location of the computing device in the non-transitory computer readable medium. Similarly, the authentication server processor may determine whether the second code is unused send an error message to the computing device when the second code is unused, receive a location of the computing device when the second code is not unused, and store the location in the non-transitory computer readable medium.

When both the first and the second authentication processes are completed successfully, the authentication server may send product package history information to the computing device, and provide the computing device with access to product package vendor information.

An example embodiment of a product package includes a substrate, and an ink on a surface of the substrate, the ink being electrically conductive and being configured to trigger a first authentication process in a computing device when the ink is proximate to the computing device. The ink may be a color outside of a visible light spectrum range.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
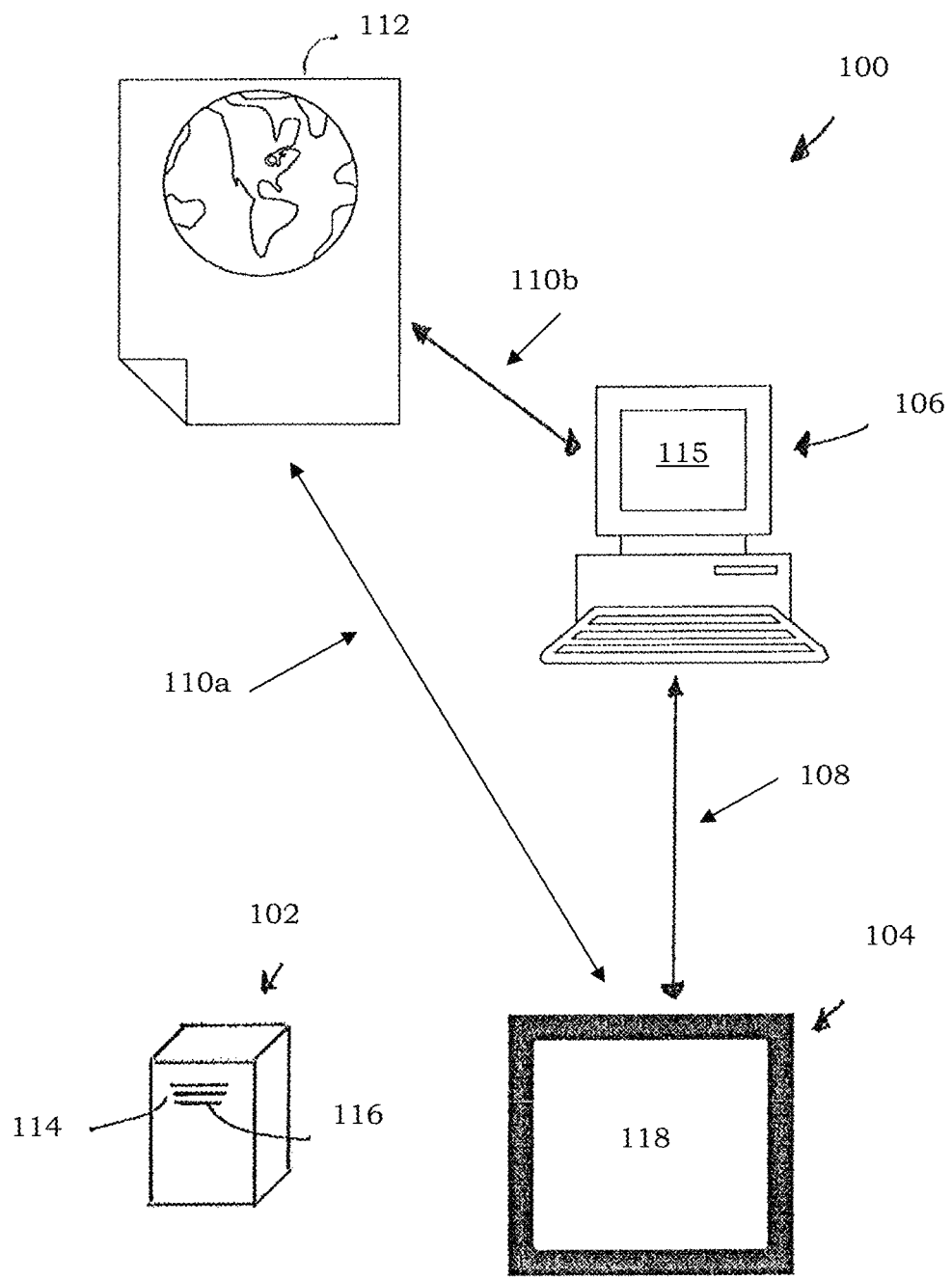
FIG. 1 illustrates an authentication system including a product package, a computing device and an authentication server according to an example embodiment.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or items, but do not preclude the presence or addition of one or more other features, integers, steps, operations, elements, items, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, items, data structures, etc., that perform particular tasks or implement particular abstract data types and may be implemented using existing hardware at, for example, existing small wireless cells, base stations, NodeBs, operator equipments (OEs) including multi-mode OEs, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

The term "operator equipment" or "OE", as discussed herein, may be considered synonymous to, and may hereafter be occasionally referred to, as operator, client, client device, mobile unit, mobile station, mobile operator, mobile, subscriber, remote station, access terminal, receiver, etc., and describes a remote operator of wireless resources in a wireless communication network (e.g., a 3GPP LTE network). The OEs discussed herein may be multi-mode OEs capable of communicating over at least LTE and WiFi.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software items, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, item, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Referring to FIG. 1, an authentication system 100 for authenticating a product package 102 includes a computing device 104 and an authentication server 106.

The computing device 104 and the authentication server 106 may be directly coupled to each other via a connection 108, which is discussed in more detail below with respect to FIG. 5, or the computing device 104 and the authentication server 106 may be coupled together via connections 110*a* and 110*b* with a network 112.

Figure 2:
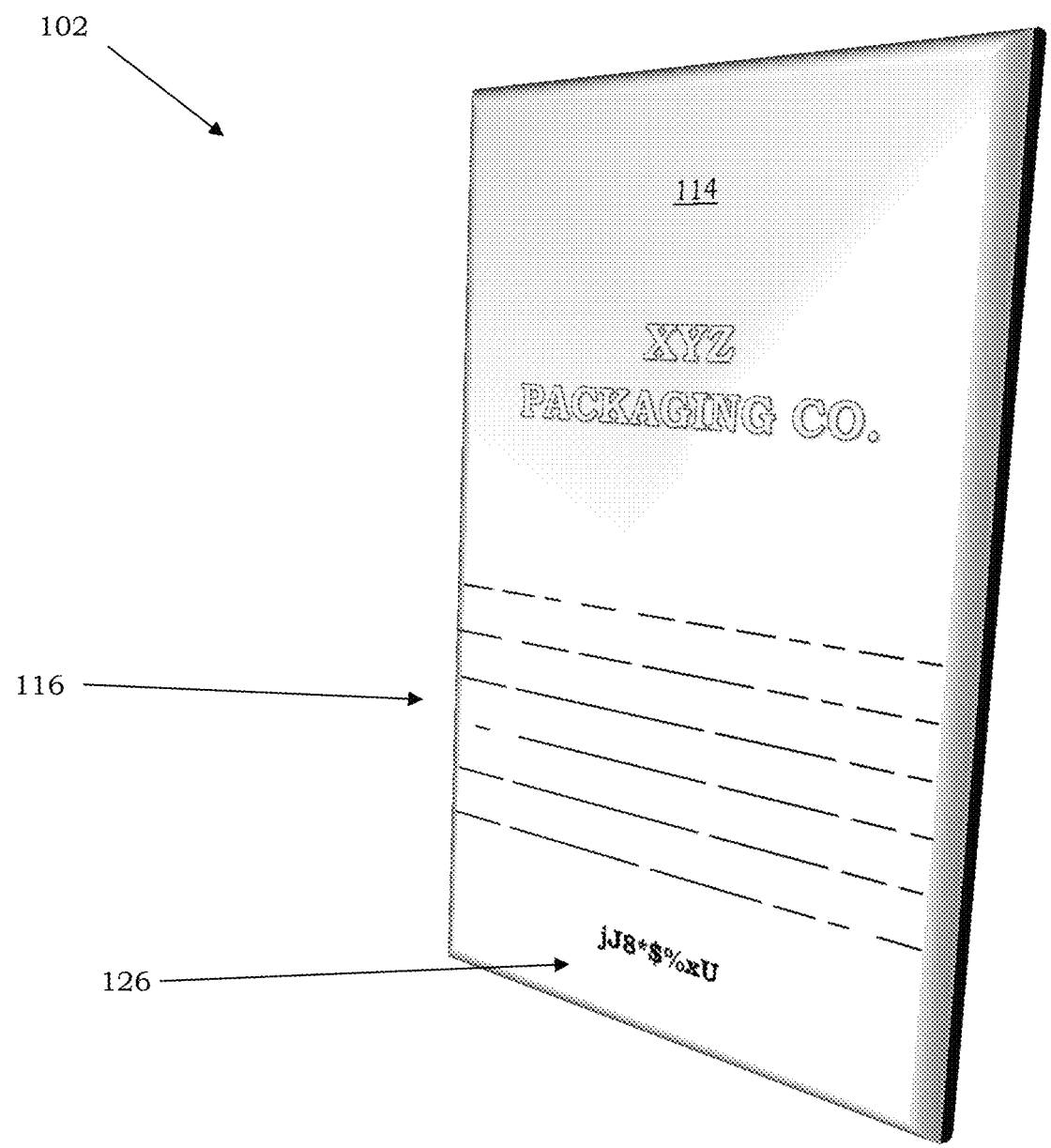
FIG. 2 illustrates a perspective view of the example embodiment of the product package shown in FIG. 1.

FIG. 2 illustrates a perspective view of the example embodiment of the product package 102. As shown in FIG. 2, the product package 102 may include a substrate 114, which is described in detail with respect to FIG. 6. The product package 102 may also include a conductive ink 116, which is also described in detail with respect to FIG. 6. Example embodiments of the product package 102 include a second code 126 (i.e., a package code, described in detail below with respect to FIG. 6) printed on the substrate 114 of the product package 102. For example, the second code 126 may be an alphanumeric code, a symbolic code, i.e., a #-%-#-*-&, or a combination alphanumeric-symbolic code. As described in more detail with respect to FIG. 6 below, the second code 126 on the substrate 114 is distinct from codes on other product packages.

Figure 3:
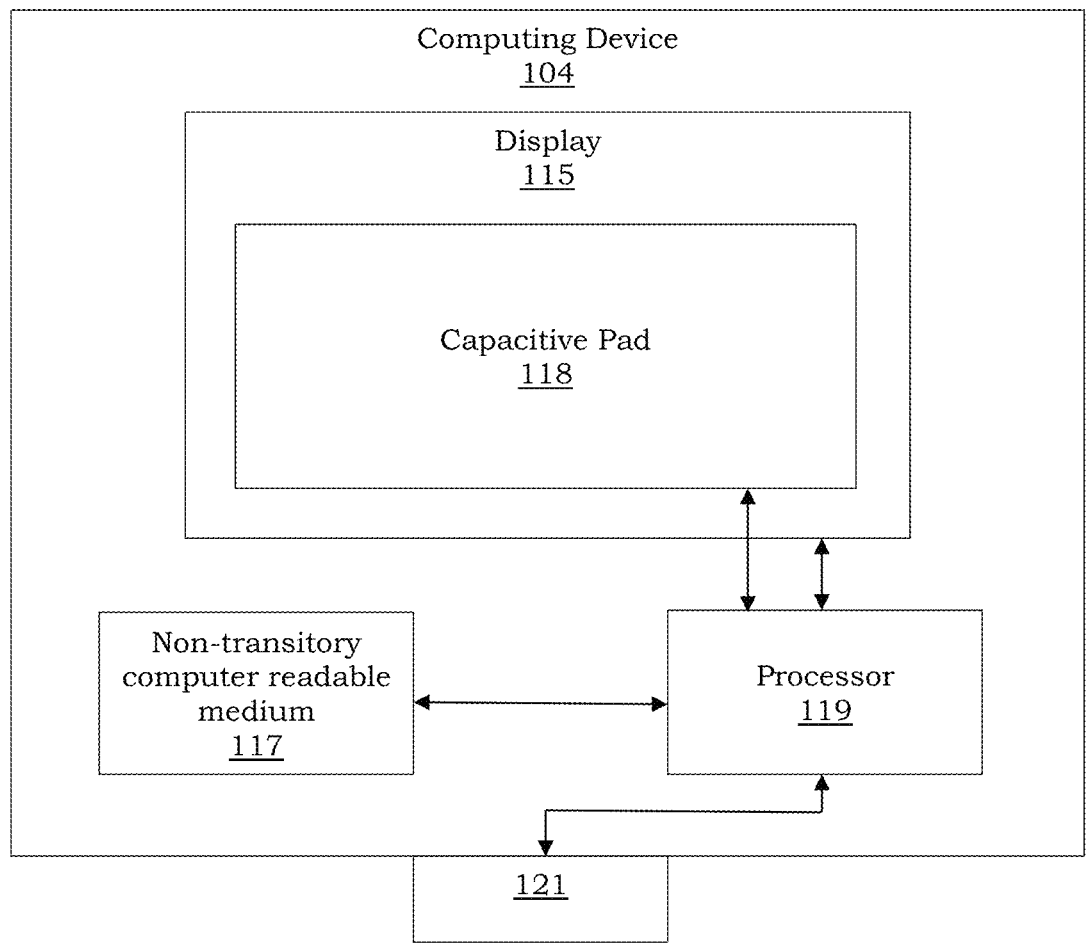
FIG. 3 illustrates an example embodiment of the computing device of FIG. 1.

FIG. 3 illustrates an example embodiment of the computing device 104. The computing device 104 may have a display 115, a non-transitory computer readable storage medium 117 and a processor 119 and/or a microprocessor or a controller. The processor 119 may control the capacitive pad 118 and receive data from the capacitive pad 118 such as data sensed by sensors 124*a*-124*aj* of the capacitive pad. Moreover, the processor 119 may execute instructions that are stored on the non-transitory computer readable storage medium 117 to perform the functions described below and operate as a special purpose computing device. Moreover, the processor 119 may output data to an external device through an Input/Output (I/O) port 121. The computing device 104 may connect to external devices/peripherals via the I/O port 121. For example, the I/O port 121 may be a wireless connection, a Bluetooth connection, a USB connection, etc.

Example embodiments of the computing device 104 may include a tablet, a smart phone, a personal computer, a laptop or any data processing capable device. The computing device 104 may include a capacitive pad 118, which is discussed in more detail below with respect to FIGS. 4a and 4b.

The computing device 104 may be a small form personal device that is small enough to fit in a pants-pocket or coat pocket, e.g., an iPhone®, a Kindle® or other smart device. Alternatively, in the present example embodiment, the computing device 104 may be a desktop type device such as a PC or MAC® computer. The capacitive pad 118 may be integral with the computing device 104. For example, the capacitive pad 118 may be an input interface that may be a part of a housing of the computing device 104. In some example embodiments, the capacitive pad 118 may be external to the computing device 104.

Figure 4A:
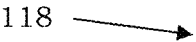
FIG. 4a illustrates an example embodiment of the capacitive pad of the computing device of FIG. 3.
Figure 4B:
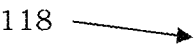
FIG. 4b illustrates a further example embodiment of the capacitive pad of the computing device of FIG. 3.

As shown in FIGS. 4a and 4b, the capacitive pad 118 includes a plurality of sensors 124a-aj. Electrically conductive material creates voltage drops at specific sensors on the capacitive pad 118. For example, referring to FIG. 4b, nine sensors on the capacitive pad 118, i.e., 124a, 124c, 124e, 124h, 124o, 124p, 124t, 124aa and 124ac, may be triggered simultaneously while the remaining capacitive pads remain idle. Configuration and excitation of the plurality of sensors 124a-124aj of the capacitive pad 118 will be discussed in more detail below with respect to FIGS. 8 and 9.

Figure 5:
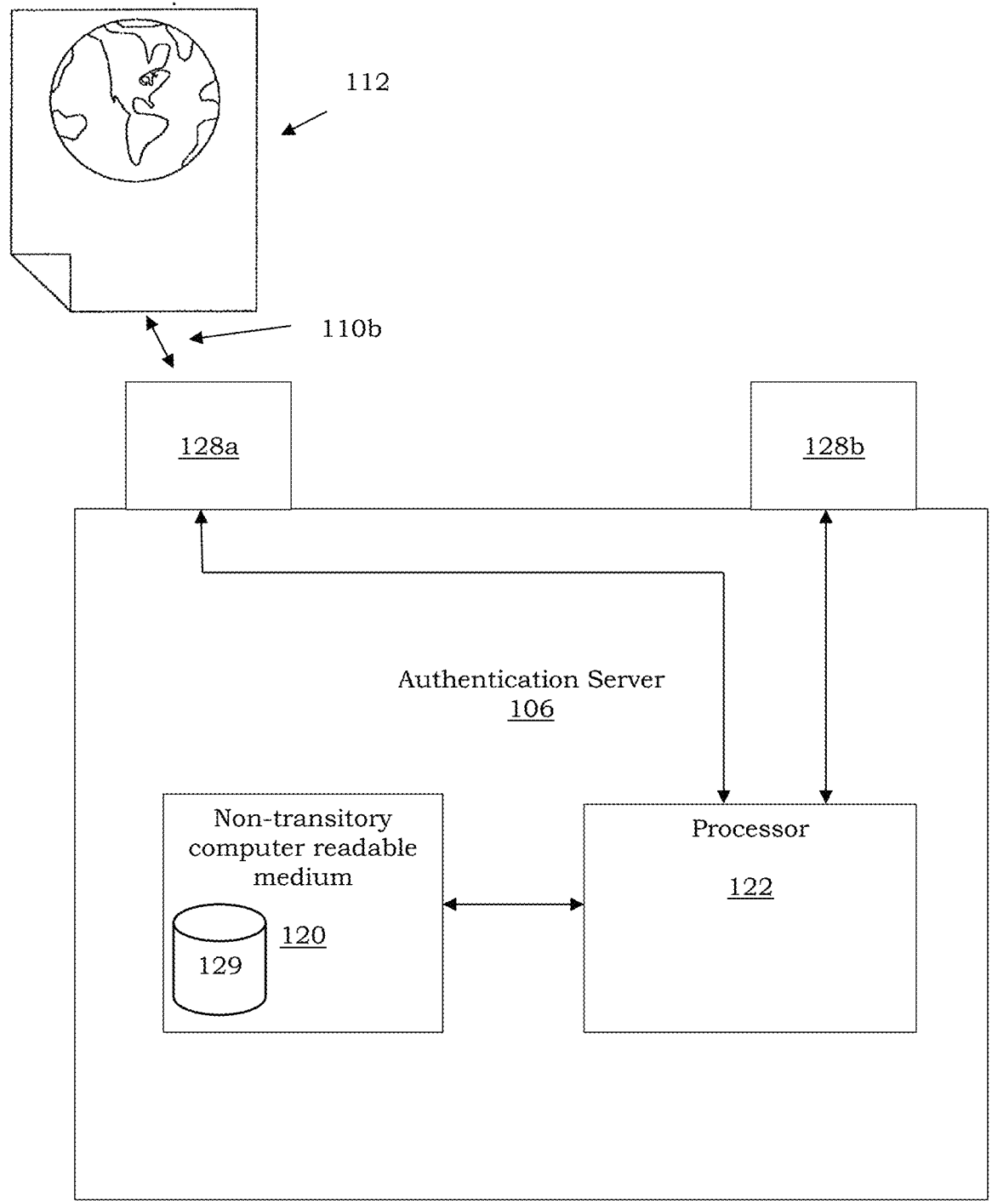
FIG. 5 illustrates an example embodiment of the authentication server of the authentication system of FIG. 1.

FIG. 5 illustrates an example embodiment of the authentication server 106. The authentication server 106 may include a non-transitory computer readable medium 120. For example, the non-transitory computer readable storage medium 120 may be an internal hard drive, an external hard drive, a cloud server, or any other data storage device. The non-transitory computer readable storage medium 120 may be configured to include a database 129. The authentication server 106 may also include a processor 122.

The processor 122 may control the functions of the authentication server such as communication with the computing device 104. Moreover, the processor 122 may execute instructions that are stored on the non-transitory computer readable storage medium 120 to perform the functions described below and operate as a special purpose computing device. Moreover, the processor 122 may output data to an external device through a wireless Input/Output (I/O) port 128a. The computing device 104 may connect to external devices/peripherals via the wireless I/O port 128a. Alternatively, the processor may receive or output data to/from an external device through a direct physical connection 128b. The direct physical connection 128b may be, for example, a universal serial bus (USB) connection.

The authentication server 106 may be located at a location known to a manufacturer of the product package 102. The authentication server 106 may be coupled to a plurality of computing devices (e.g., the computing device 104). For example, the authentication server 106 may host the manufacturer's webpage and provide access to the plurality of computing devices through the network 112 via the connection 110b. In this example embodiment, therefore, any of the plurality of computing devices is coupled to the authentication server 106 through the network 112 via the wireless connection port 128a and the connection 110a. Alternatively, a computing device may be connected locally through a direct physical connection 128b.

Figure 6:
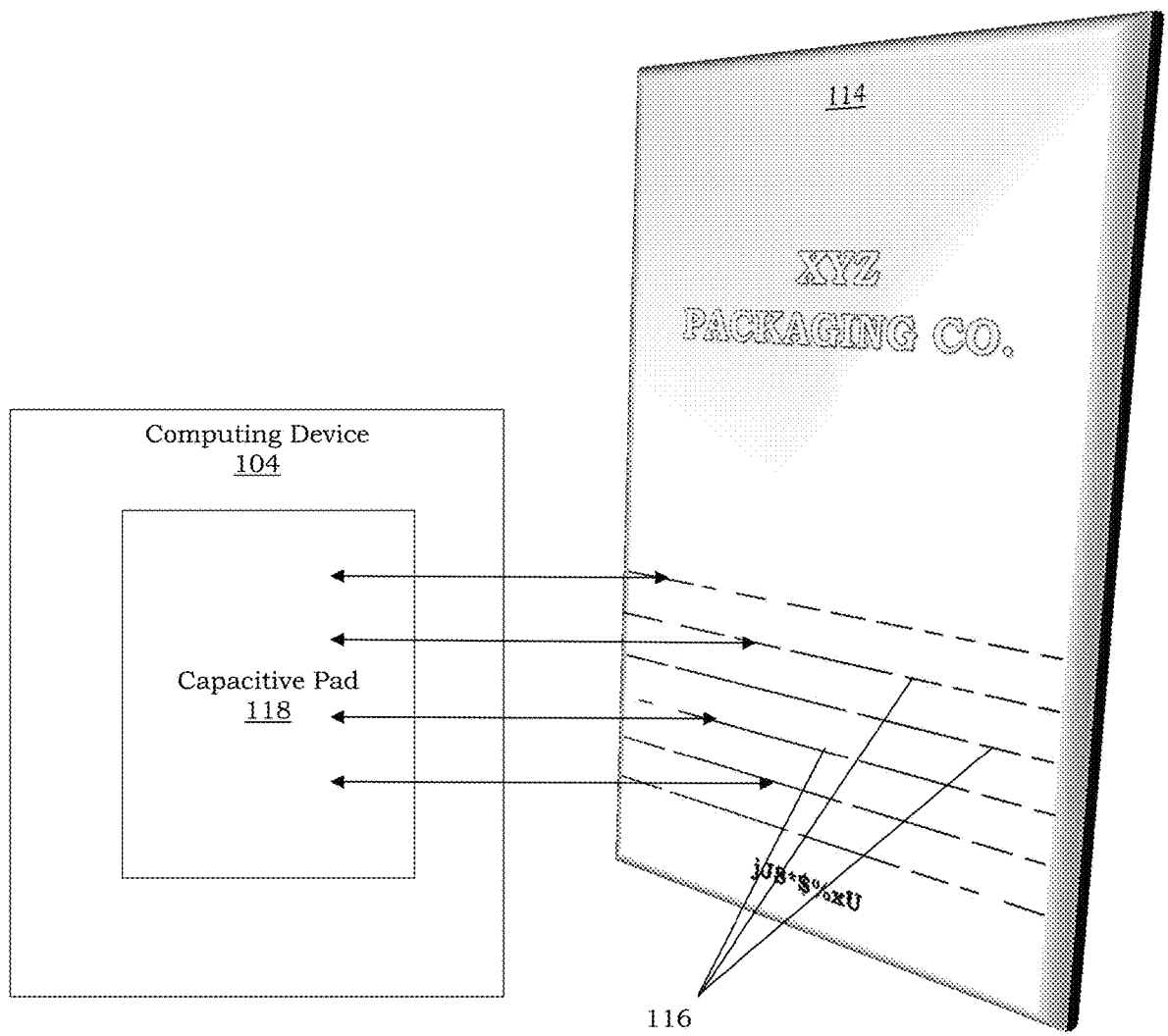
FIG. 6 illustrates an example interaction between the computing device and the product package of FIG. 1.

FIG. 6 illustrates an example relationship between the computing device 104 and the product package 102. Specifically, FIG. 6 is an example relationship between the capacitive pad 118 of the computing device 104 and the conductive ink 116 of the product package 102. Interaction between the capacitive pad 118 and the computing device 104 will be discussed in more detail below with respect to FIG. 8.

The product package 102 may be any of a variety of package types. For example, in an example embodiment, the product package may be a package for an electronic vaping device. The product package 102 of the example embodiment may be any configuration such as a rectilinear box, a clamshell type container, a circular disk-like container and any other configuration for holding electronic vaping devices (not shown). Alternatively, each electronic vaping device within the product package 102 may be manufactured to include its own second code 126. The second code 126 may be placed anywhere on an external surface of the packaging.

In the vaping device product package example embodiment, it is not required that the second code 126 be placed on the external surface of the packaging. For example, in clamshell type boxes, the second code 126 may be placed on an internal surface of the box. Therefore, it is more difficult to obtain the second code 126 without purchasing the product package. It is also possible to place the second code 126 on a concealed surface of a vaping device such as at a connector of the vaping device.

The system 100 is not limited to use in electronic vaping device products. For example, other industries may use the system 100 such as the electronics industry in general, housing construction, food industry, etc. Each manufacturer may have a conductive ink configuration that is unique to that manufacturer.

In the example embodiment, each second code 126 is randomly generated to reduce predictability of second codes that will be printed on the product package. For example, a manufacturer that creates ten thousand identical product packages may attach a second code to each package. As such, the manufacturer may randomly create ten thousand codes, i.e., one respective code per product package.

With further reference to FIG. 6, the conductive ink 116 is an ink that may include an electrically conductive material such as iron, carbon or silver. The electrically conductive material may be in the form of metal filings or shavings contained in the ink.

The conductive ink 116 may be placed anywhere on the product package 102. For example, the conductive ink may be placed on the substrate 114, which as shown in the example embodiment illustrated in FIG. 6, is a planar front surface of the product package 102. In other example embodiments, the conductive ink 116 may be on a side region, end region or edge region of the product package 102.

As stated above, FIG. 6 illustrates an example relationship between the capacitive pad 118 and the conductive ink 116. For example, the conductive ink 116 may have any number of configurations. In the example embodiment shown in FIG. 6, the conductive ink 116 has a configuration resembling Morris Code. Alternatively, the conductive ink may be configured as a circuit. For example, the conductive ink 116 may have a Quick Response Code (QR Code) type design. Alternatively, the conductive ink 116 may have a bar code type design. The bars of the bar code design may be configured in any orientation, i.e., vertically, horizontally, diagonally, skewed, etc. The conductive ink 116 may be placed on the substrate 114 in a plurality of ways, i.e., painted, sputter deposited, etched, laser printed, etc.

The conductive ink 116 may have a color outside of the visible range of the light spectrum. Having a code outside of the visible range of the light spectrum, e.g., infrared or ultraviolet helps hinder counterfeiting efforts. Alternatively, the conductive ink 116 may have a visible color, i.e., a color inside the visible range of the light spectrum.

Operation of the present example embodiment will now be described.

Figure 7:
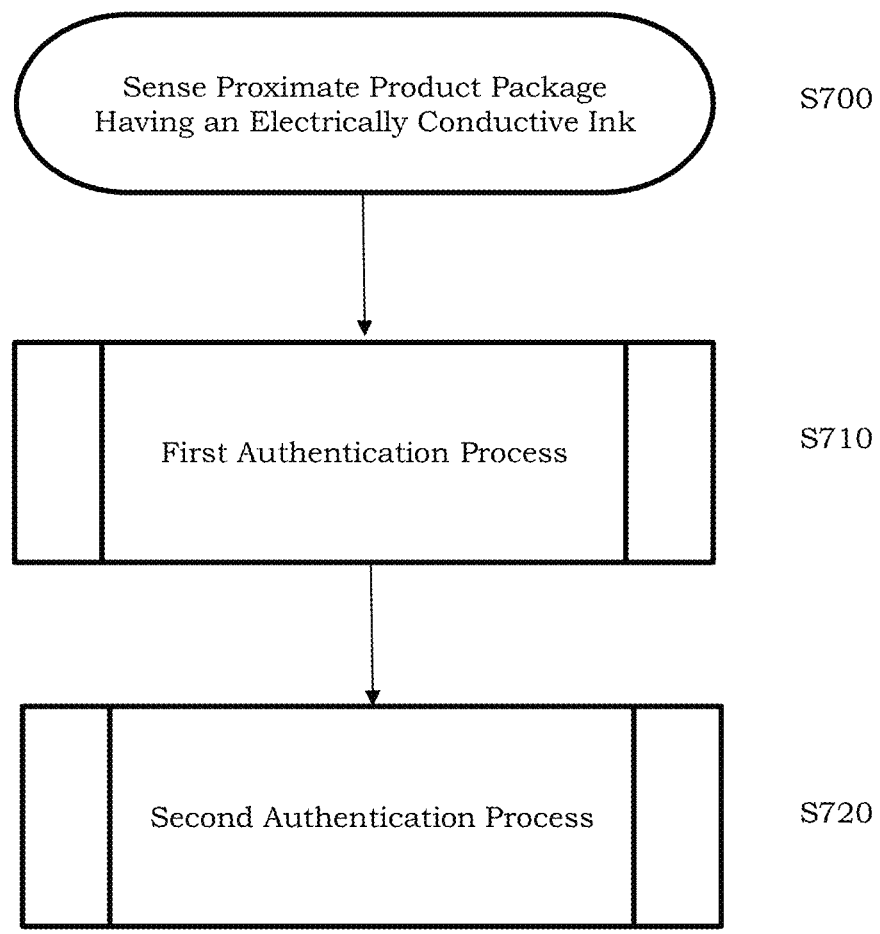
FIG. 7 illustrates a flowchart showing an authentication initialization process according to an example embodiment.

FIG. 7 illustrates an example method of authenticating a product package. As shown in FIG. 7, at step S700 the sensors 124a-124aj sense the presence of the product package 102 having the electrically conductive ink 116. The first process 710 may occur entirely within the computing device 104. For example, at step S710, the computing device 104 performs a first authentication process, which is discussed in detail with respect to FIG. 8. At step S720, the computing device 104 and server 106 perform a second authentication process, which is discussed in detail with respect to FIG. 9.

Figure 8:
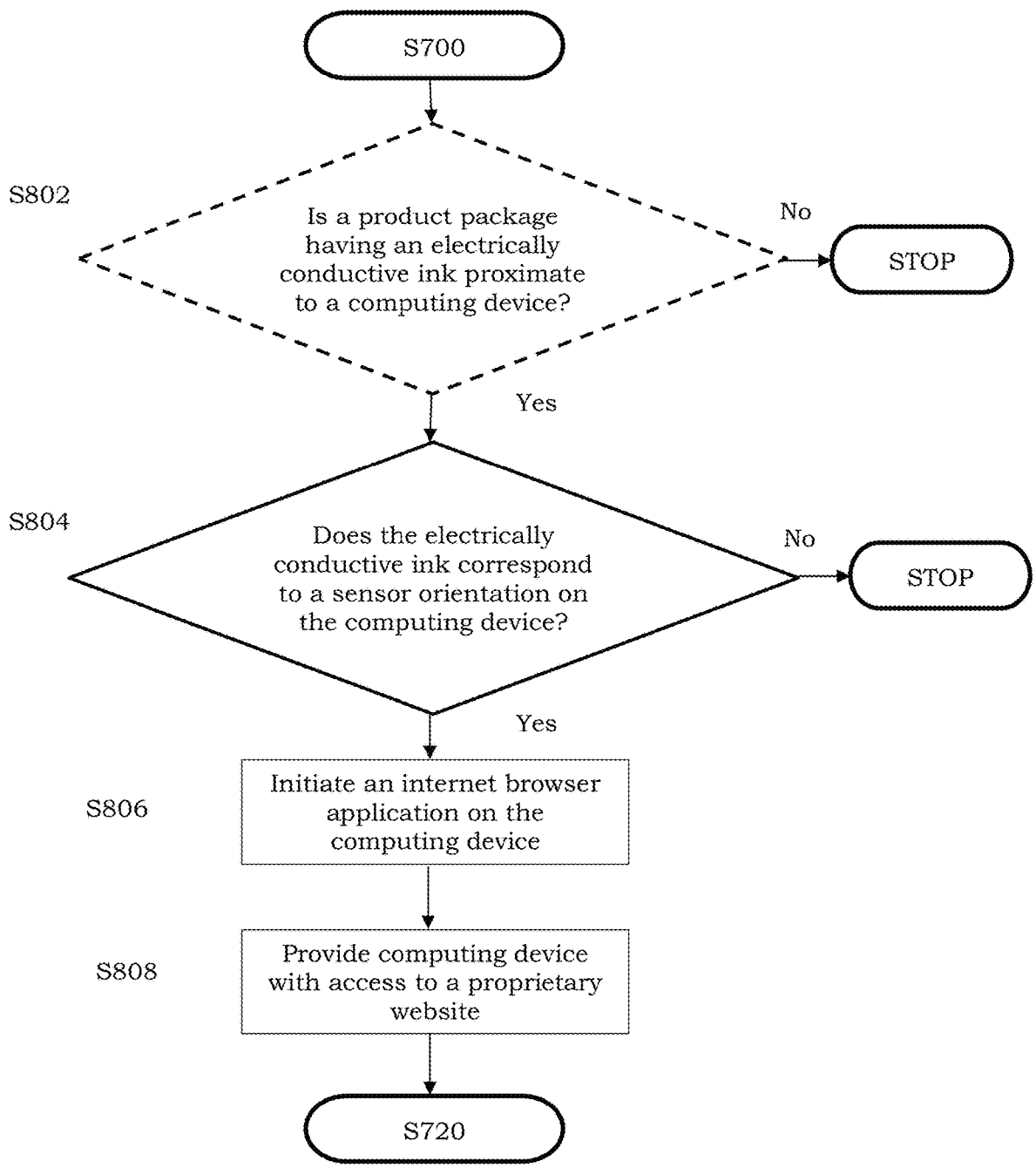
FIG. 8 illustrates a flowchart showing a first authentication process according to an example embodiment.

FIG. 8 illustrates the first authentication process S720 of FIG. 7. As shown, the process S720 begins when the product package 102 is sensed by the sensors 124a-124aj of the capacitive pad 118. For example, the sensors 124a-124aj are operable in response to being in contact with or in close proximity, i.e., within two to three millimeters, with anything that can hold a charge, e.g., electrically conductive material, human skin, etc. When the electrically conductive material, e.g., electrically conductive ink 116, comes in proximity to the sensors 124a-124aj, a small electrical charge is transferred to the electrically conductive ink 116 to complete a circuit. A voltage drop is thereby created at the sensors 124a-124aj of the capacitive pad 118. The processor 119 of the computing device 104 reads the location of this voltage drop and is configured to act in response to thereto.

At step S802 the processor 119 of the computing device 104 determines whether a product having an electrically conductive ink is in close proximity. For example, the processor 119 determines whether any of the sensors 124a-124aj outputs data/a signal corresponding to the capacitive ink 116. Step S802 provides an activation step for the processor 119. Alternatively, step S802 may be an optional step. The processor 119 may altogether bypass step S802. For example, the processor 119 may be configured to react only if proper sensors of the entirety of sensors 124a-124aj are sense the conductive ink. As such, the process can begin with step S804 below.

If step S802 is used and the processor 119 determines that the package includes an electrically conductive ink, the process proceeds to step S804. However, if no ink is sensed by any of the sensors 124a-124aj, the processor 119 takes no action.

At step S804, the processor 119 determines whether the electrically conductive ink 116 is in a shape that is configured to trigger appropriate sensors, for example, 124a, 124c, 124e, 124h, 124o, 124p, 124t, 124aa and 124ac as shown in FIG. 4b may be the appropriate sensors. The electrically conductive ink 116 as shown in FIG. 2 may be configured to correspond only to sensors 124a, 124c, 124e, 124h, 124o, 124p, 124t, 124aa and 124ac. If any other sensor, in addition to the nine sensors shown in FIG. 4b (124a, 124c, 124e, 124h, 124o, 124p, 124t, 124aa and 124ac) is triggered, the processor 119 may be configured to take no action.

If, at step S804, the processor 119 determines that the electrically conductive ink is configured to trigger the nine sensors shown in FIG. 4b, the appropriate sensors, the process proceeds to step S806. At step S806, the processor 119 opens an internet browsing on the computing device 104.

At step S808, after opening the internet browsing, the processor 119 opens a webpage. The webpage may be a proprietary webpage that belongs to the manufacturer of the product package 102. Alternatively, the webpage may be any other webpage that the manufacturer of the product package 102 may want to present to the holder of the product package 102.

The webpage may be an exclusive webpage in which the only way to access the webpage, other than being the webpage administrator, is via an internet browsing application activated by the electrically conductive ink 116 exciting the appropriate sensors.

As stated above, the first authentication process 710 may occur entirely within the computing device 104 and ends after the computing device opens the manufacturer's webpage. The computing device 104 gaining access to the manufacturer's webpage may be a confirmation that the first authentication process 710 was completed successfully. For example, if the webpage fails to open after performing all of the steps recited in the first authentication process 710, it may be because at least one of the steps of the first authentication process 710 was performed incorrectly. Failure of the webpage to open may have nothing to do with whether the first authentication process 710 was performed properly. For example, failure of the webpage to open could alternatively be because the computing device 104 was defective in some way.

Figure 9:
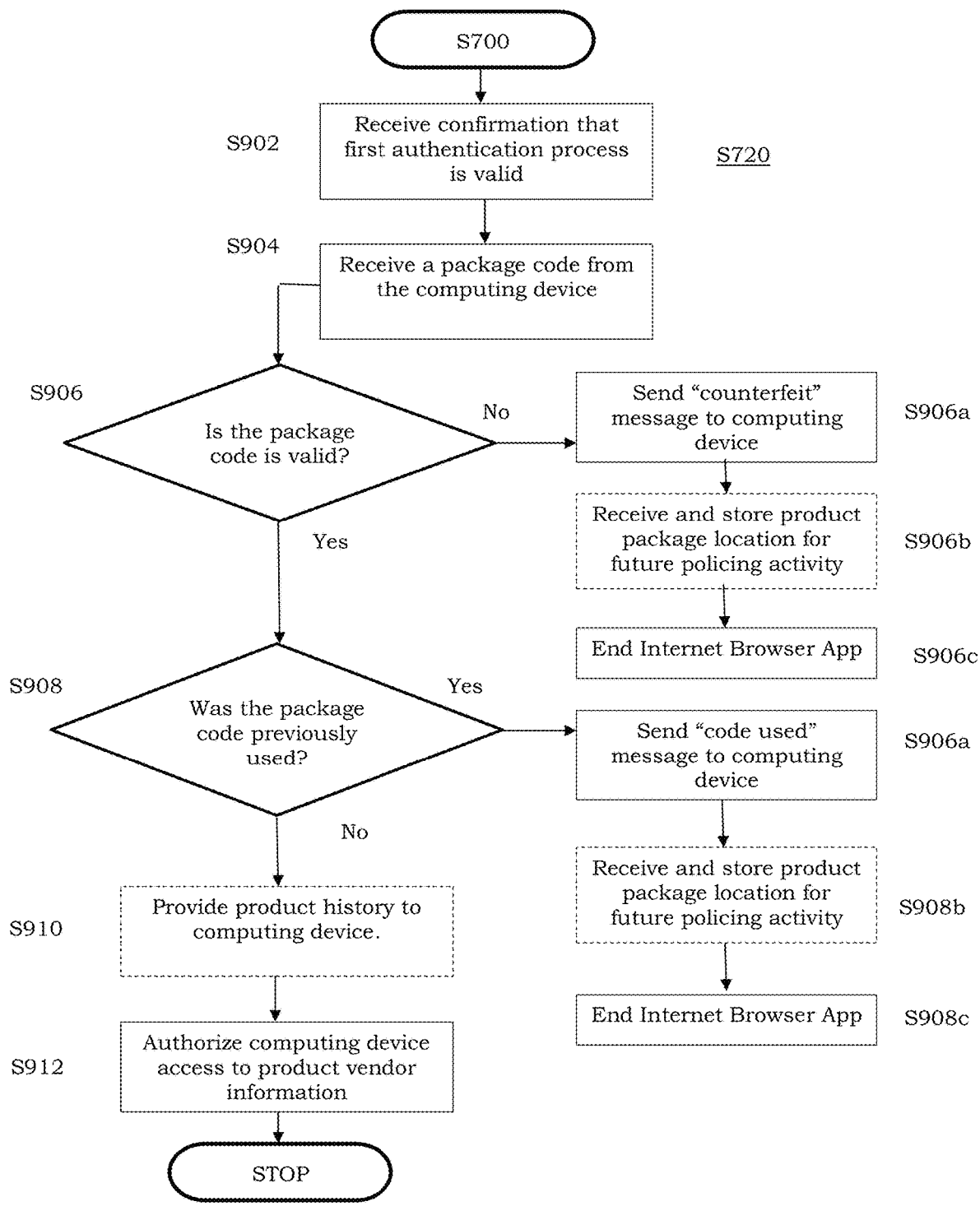
FIG. 9 illustrates a flowchart showing a second authentication process according to an example embodiment.

After the webpage is opened in step S808, the process proceeds to the second authentication process S720. FIG. 9 illustrates a flow chart of the second authentication process S720 in FIG. 7 according to an example embodiment. As shown in step S902, the authentication server 106 receives confirmation from the computing device 104 that the first authentication process S710 is valid. For example, in the event that the manufacturer's webpage can only be opened when an electrically conductive ink properly triggers correct sensors on a capacitive pad, the authentication server 106 may interpret the step of connecting the computing device 104 to the product package manufacturer's webpage as confirmation that the first authentication process S710 was completed successfully. The authentication server 106 providing the computing device 104 with access to the manufacturer's webpage that is hosted by the authentication server 106 thus serves as confirmation from the computing device 104 that the first authentication process 710 has been completed successfully.

At step S904, the authentication server 106 receives the second code 126 from the computing device 104. For example, after the internet browser on the computing device 104 is opened, the computing device 104 requests entry of the second code 126, i.e., the code printed on the substrate 114 as shown in FIG. 2.

At step S906, the authentication server 106 determines whether the code is valid. For example, the authentication server 106 refers to a database 129 that may be stored on the internal non-transitory computer readable medium 120, i.e., a hard drive, to determine whether the second code 126 is stored therein.

If the second code is not found, the process proceeds to step S906a and sends a message to the computing device 104 indicating that the product package 102 may be counterfeit. The process then optionally proceeds to step S906b and receives and then stores a location of the computing device 104. The authentication server 106 may store computing device locations to establish possible counterfeiting geographic trends. If location information for the computing device 104 is not available or accessible by the authentication server 106, the process may proceed directly to step S906c in which the authentication server 106 discontinues computing device access to the webpage.

Returning to step S906, if the second code 126 is successfully found on the database 129, the process proceeds to step S908 to determine whether the second code 126 is unused. For example, the authentication server 106 refers to the second code database 129 to determine whether the second code 126 has been used before the present attempt at entering the second code 126. Each code may have an associated timestamp, which may also be maintained in the database 129 stored in the non-transitory computer readable medium 120. Each code may have an associated timestamp, which may be also be maintained in the non-transitory computer readable medium 120. In the present example embodiment, the second code 126 may be used only once.

If the second code 126 has been used, the process proceeds to step S908a and sends a message to the computing device 104 indicating that the second code 126 has already been used. The process then optionally proceeds to step S908b and receives and then stores a location of the computing device 104. As it is possible that the code may be valid, the code may have been recovered by a counterfeiter and printed on a counterfeit product package. The authentication server 106 may store computing device locations to establish possible counterfeiting geographic trends. If location information for the computing device 104 is not available or accessible by the authentication server, the process may proceed directly to step S908c in which the authentication server 106 discontinues computing device access to the webpage.

If the second code 126 is determined to be valid (at step S906) and unused (at step S908), the process optionally proceeds to step S910. At step S910, the authentication server 106 sends product history to the computing device 104. For example, the authentication server 106 may provide a manufacture date, product pricing confirmation, serial numbers, etc.

At step S912, the authentication server 106 authorizes access to product manufacturer information. For example, a manufacturer may desire to provide coupons or incentives to the product package holder as an exchange for undergoing the authentication process. These coupons and incentives may be exclusively found on the manufacturer's webpage.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An authentication method comprising:
   sensing an electrically conductive ink in proximity to a computing device, the computing device including a capacitive pad having one or more sensors, the electrically conductive ink being printed on a surface of a product;
   sensing a desired pattern of the electrically conductive ink using the one or more sensors of the capacitive pad;
   initiating an internet browsing application running on the computing device in response to triggering appropriate sensors of the one or more sensors of the capacitive pad;
   receiving a package code from the computing device;
   determining whether the package code is present in a non-transitory computer readable medium; and
   providing the computing device with access to information if the package code is present in the non-transitory computer readable medium.

2. The authentication method as recited in claim 1 further comprising:
   determining whether the package code is valid; and
   sending an error message to the computing device when the package code is invalid.

3. The authentication method as recited in claim 2, further comprising:
   receiving a location of the computing device when the package code is not valid, and
   storing the location of the computing device in the non-transitory computer readable medium.

4. The authentication method as recited in claim 2, further comprising:
   determining whether the package code is unused, if the package code is valid; and
   sending an error message to the computing device when the package code is unused.

5. The authentication method as recited in claim 4, further comprising:
   receiving a location of the computing device when the package code is not unused; and
   storing the location of the computing device in the non-transitory computer readable medium.

6. The authentication method as recited in claim 4, further comprising:
   sending product package history information to the computing device when the package code is not unused; and
   providing the computing device with access to product package vendor information.

7. An authentication server having a non-transitory computer readable medium storing instructions that, when executed by a processor, cause the processor to:
   receive confirmation from a computing device that a first authentication process is valid, the first authentication process including,
      sensing an electrically conductive ink in proximity to the computing device, the computing device including a capacitive pad having one or more sensors, the electrically conductive ink being printed on a surface of a product,
      sensing a desired pattern of the electrically conductive ink using the one or more sensors of the capacitive pad, and
      initiating an internet browsing application running on the computing device in response to triggering appropriate sensors of the one or more sensors of the capacitive pad;
   receive a package code from the computing device;
   refer to a non-transitory computer readable medium to determine whether the package code is present in the non-transitory computer readable medium; and
   provide the computing device with access to software stored on the non-transitory computer readable medium when the package code is present in the non-transitory computer readable medium.

8. The authentication server of claim 7, wherein the processor is configured to:
determine whether the package code is valid and send an error message to the computing device when the package code is invalid.

9. The authentication server of claim 7, wherein the processor is configured to:
receive a location of the computing device when the package code is not valid, and
store the location of the computing device in the non-transitory computer readable medium.

10. The authentication server of claim 9, wherein the processor is configured to:
determine whether the package code is unused and send an error message to the computing device when the package code is unused.

11. The authentication server of claim 10, wherein the processor is configured to:
receive a location of the computing device when the package code is not unused, and
store the location of the computing device in the non-transitory computer readable medium.

12. The authentication server of claim 9, wherein the processor is configured to:
send product package history information to the computing device when the package code is not unused, and
provide the computing device with access to product package vendor information.

13. A product package comprising:
a substrate;
an ink on a surface of the substrate, the ink being electrically conductive and including in a pattern configured to trigger a first authentication process in a computing device when the pattern of the ink is proximate to a capacitive pad of the computing device having a plurality of sensors and when the pattern of the ink simultaneously triggers appropriate sensors of the plurality of sensors of the capacitive pad; and
a package code on the surface of the substrate, the package code configured to trigger a second authentication process,
wherein the second authentication process includes
sending the package code to a remote server,
receiving a product authentication determination from the remote server, the product authentication determination is valid when (i) the package code is in a database at the remote server and (ii) the package code has not been used before a present attempt,
in response to the product authentication determination indicating the package code is excluded from the database or the package code has been used before the present attempt, determining a location of the computing device, and
sending the location of the computing device to the remote server for storage.

14. The product package as recited in claim 13, wherein the ink comprises a color outside of a visible light spectrum range.

* * * * *